United States Patent Office 3,636,030
Patented Jan. 18, 1972

3,636,030
RECOVERY OF AROMATIC DIISOCYANATES
FROM STILL RESIDUES
Gilbert T. Perkins, Beaumont, Tex., assignor to E. I. du
Pont de Nemours and Company, Wilmington, Del.
No Drawing. Filed Dec. 16, 1968, Ser. No. 784,220
Int. Cl. C07c 119/04
U.S. Cl. 260—453 SP            5 Claims

ABSTRACT OF THE DISCLOSURE

A process for recovering aromatic diisocyanate values from distillation residues obtained in the manufacture of aromatic diisocyanates, said process comprising the steps of (1) adding a solution of the still residues, in an inert organic solvent such as orthodichlorobenzene, to aqueous hydrochloric or hydrobromic acid at about 25 to 150° C. so that isocyanates, biurets and carbodiimides present in said residues are at least partially hydrolyzed, (2) phosgenating the resulting mixture at about 150 to 200° C. in the presence of less than 10% by weight of water based on the weight of still residues and (3) recovering aromatic diisocyanate from the phosgenated mixture.

BACKGROUND OF THE INVENTION

Aromatic diisocyanates, such as metaphenylene diisocyanate, 4,4'-methylene bis(phenylisocyanate), xylene diisocyanates, and tolylenediisocyanates (TDI), are conventionally made by subjecting aromatic amines to contact with phosgene at elevated temperatures and/or pressures and distilling off the corresponding diisocyanate. The reactions, written in terms of monofunctional species for simplicity, are as follows:

(1)
$$RNH_2 + COCl_2 \longrightarrow HCl\uparrow + R-\underset{H}{\underset{|}{N}}-\underset{\parallel}{\underset{O}{C}}-Cl$$
A Carbamyl Chloride (2)
$$R-\underset{H}{\underset{|}{N}}-\underset{\parallel}{\underset{O}{C}}-Cl \xrightarrow{\Delta} HCl\uparrow + RCNO$$
An Isocyanate Side reactions, which are undesired and lead to the formation of still residue, occur as follows:

(3)
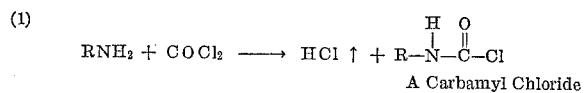
A Urea (4)
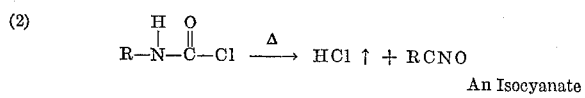
A Biuret (5)
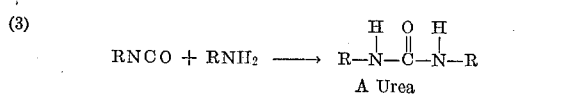

or

An Allophanyl Chloride (6)
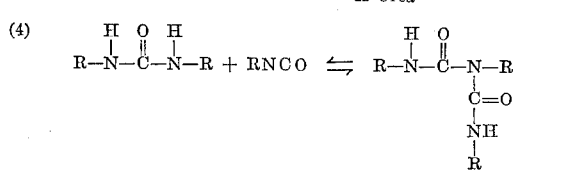

(7)
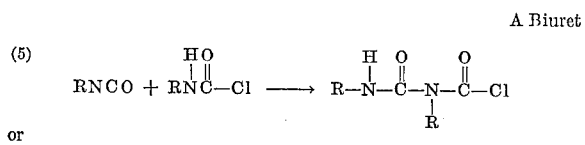
A Carbodiimide (8)
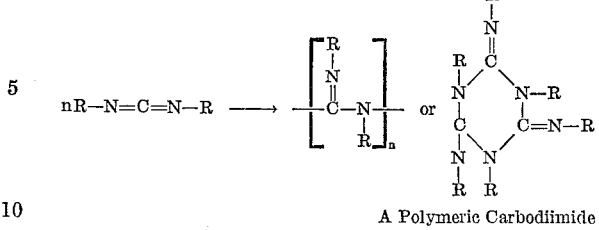
A Polymeric Carbodiimide

The side reactions lower appreciably the yield of aromatic diisocyanate which it is possible to obtain from the desired reaction and improvement is obviously desirable. The problem of improving yields is further complicated by the fact that a substantial amount of the potential aromatic diisocyanate remains entrapped in the still residues not only as diisocyanate but also as biurets, carbodiimides, etc., and efforts to recover additional diisocyanate as by increasing the distillation temperature, often serve only to increase the proportion of by-products.

Numerous expedients have been proposed for recovering values from isocyanate still residues. According to U.S. Pat. 3,128,310 issued Apr. 7, 1964 to Hans-Joachim Koch aromatic amines are recovered by heating the residues with water at temperatures within the range of 160 to 250° C. under pressure, preferably in the presence of a small amount of alkali. In U.S. Pat. 3,225,094 issued Dec. 21, 1965 to Herbert Otto Wolf a process is disclosed wherein polyamines are recovered by contacting the residues with steam superheated to 200 to 400° C. U.S. Pat. 3,184,493 issued May 18, 1965 to Kunze et al. describes a method wherein polyurea particles in the residues are contacted with phosgene at a temperature between 100 and 300° C. while the particles are suspended in an inert liquid having a boiling point above the boiling point of the polyisocyanate resulting from the reaction of the polyurea with phosgene. U.S. Pat. 3,331,876 issued July 18, 1967 to Van Horn et al. claims a process for obtaining tolylenediamine from phosgenation tar by treating it with water and alkali metal hydroxide at 260 to 350° C.

It can be seen that there has been no lack of proposed methods for recovering values from the phosgenation still residues, but all such methods have left much to be desired, either as to practicality or obtainable yields.

Attempts have been made to recover TDI by phosgenating the TDI still residues directly but little residue is converted to TDI by the procedure, whether solvents are employed or not. Use of water alone does not result in hydrolysis of still residues, but rather, results in a slurry which is semi-solid and unmanageable. Use of dimethylethanol amine in aqueous solution for hydrolyzing the still residues results in recovery of less TDI than the actual TDI content of the residues before attempting hydrolysis.

SUMMARY

Now according to the present invention it has been found that a very practical process for obtaining high yields of recovered values from phosgenation still residues and recovering such values directly in the form of the desired aromatic diisocyanate, comprises (1) adding a solution of the still residues in an inert organic solvent to aqueous hydrochloric or hydrobromic acid at about 25 to 150° C. to effect partial hydrolysis of recoverable values therein, (2) effecting contact of the remaining mixture with phosgene at about 150 to 200° C. in the presence of less than 10% by weight of water, based on the weight of still residues, the water preferably being removed substantially to zero, whereby a phosgenation reaction occurs, and (3) recovering aromatic diisocyanate from the phosgenated mixture.

The reactions occurring in steps 2 and 3 are indicated by the following equations, it being understood that other reactions, not illustrated, also take place.

(9) 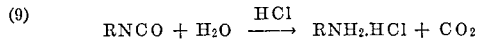

(10) 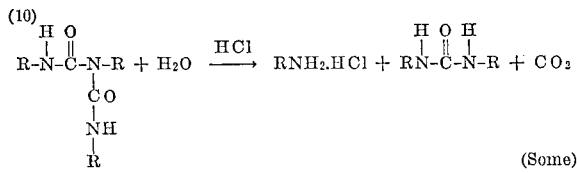

(11) 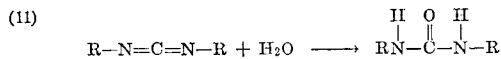

(12) 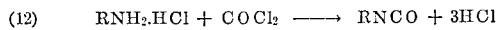

(13) 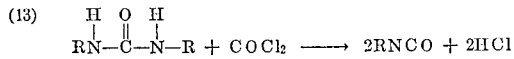

DESCRIPTION OF THE PREFERRED EMBODIMENTS

The processes of the present invention are applicable to the recovery of values from conventional still residues resulting from phosgenating aromatic amines to aromatic diisocyanates. Such residues are described, for instance in the Wolf U.S. Pat. 3,225,094 and other patents abovementioned and any of these residues may be used. The residues are sometimes referred to as tars.

While the tars contained in solvent-free crude phosgenation products can be concentrated for use in the present process by removing volatile isocyanates in conventional distillation equipment, it is preferred to use distillation equipment which minimizes the exposure of the crude product to elevated temperatures. As is known to those skilled in the manufacture of isocyanates, extended heating of crude phosgenation products containing tarry phosgenation by-products increases their viscosity substantially, particularly when the concentration of tars is high. For this reason, more complete removal of volatile isocyanate from non-volatile by-products is possible in distillation equipment providing short residence times while yet maintaining sufficient fluidity in the concentrated tar to permit handling in pumps and pipelines. Representative of suitable types of equipment providing limited residence time are rising film evaporators as described in British Pat. 835,645, falling film evaporators as described in U.S. Pat. 3,198,241 to Baird, wiped film evaporators as described in U.S. Pat. 2,927,634 to Gudheim and spinning disc evaporators as described in U.S. Pat. 2,210,928 to Hichman.

In concentrating the tars contained in crude tolylene diisocyanate, the use of two rising film evaporators in series, substantially as shown in British Pat. 835,645, has been found to be particularly advantageous because of low initial investment, low operating costs and high recoveries of tolylene diisocyanate. Both evaporators are jacketed and heated with 100 to 150 p.s.i.g. steam. The bulk of the volatile tolylene diisocyanate contained in solvent-free crude is removed in the first evaporator which is operated at a pressure of about 5–45 mm. Hg measured at the top of the evaporator tube. The undistilled liquid taken from the first evaporator is concentrated further in the second evaporator at about 1–5 mm. Hg at the top of the tube. Pumpable concentrated tolylene diisocyanate tar containing less than 25% volatile diisocyanate may be obtained by this procedure. The concentrate is ideally suited for chemical treatment in the process of the present invention.

In carrying out a process of this invention one first dissolves the tars or residues in an inert organic solvent. By "inert" is meant that the solvent does not react with functional groups in the residues and is not readily hydrolyzed. It is desirable that the solvent dissolve the residues completely, but to the extent that the components do dissolve in a partial solvent some benefit of the novel processes can be realized. Suitable solvents include, for example, benzene, toluene, xylenes, chlorobenzene, dichlorobenzenes, tetrahydronaphthalene, chlorotoluenes, chlorinated aromatic hydrocarbons, nitrobenzene, cyclohexane, kerosene, benzine, carbon tetrachloride, tetrachlorethylene, trichlorethylene, amylbenzene, c-, m- and p-cymenes, dodecylbenzene, naphthalene, heptylcyclopentane, diphenyl chlorinated diphenyls, heptane, dioxane, dibutylether and diisobutyl ketone. Of these solvents, orthodichlorobenzene is particularly preferred.

The solution of still residues is added to an aqueous solution of hydrochloric or hydrobromic acid. Preferably the acid is concentrated (e.g. 37% HCl) but diluted solutions (e.g. 5%) can be used. The temperature of the mixture during addition is maintained in the range of about from 25 to 150° C. The effect of the addition to strong acid is to at least partially hydrolyze or to hydrate the recoverable values in the residue. Effective agitation is maintained during this step of the process.

From the residue-acid mixture preferably all separate phase water is removed, or at least the water content is limited to below 10% by weight, based on the weight of still residues. Such methods of removal as centrifugation or decantation can be used but is preferred to remove the water by distillation since some recoverable values are lost by other methods. Most practically, a portion of the water—say up to 50%—is distilled off at atmospheric pressure (maximum pot temperature 140° C.) and the remainder is distilled off at reduced pressure (e.g. 55 mm. Hg maximum pot temperature 105° C.).

Having removed the water, the remaining mixture is phosgenated by effecting contact between it and the phosgene, as by bubbling the phosgene gas through the still residue. The temperature of the reacting media is maintained in the range of 150 to 200° C. At higher or lower temperatures the conversion to the desired, recoverable products drops off, although temperatures as low as 125° C. or as high as 210° C. can be used with some benefit.

The phosgenation reaction converts the partially hydrolyzed recoverable values in the still residues to desired aromatic diisocyanates. These are recoverable, as by distillation preferably at reduced pressure such as under vacuum. This step of the process is similar to the original distillation which formed the original still residues being treated.

The processes of the invention can be operated batchwise or continuously. They are broadly applicable to the recovery of aromatic diisocyanates, including such specific compounds as metaphenylene diisocyanate; 4,4'-methylene bis(phenylisocyanate), xylene diisocyanate, and tolylenediisocyanate, the processes having especial advantages in recovering the compound last-listed.

The invention will be better understood by reference to the following illustrative examples:

EXAMPLE 1

A portion (99.0 gm.) of distillation residue obtained from the manufacture of an 80:20 mixture of 2,4- and 2,6 - tolylenediisocyanate, which residue contained 43.7% distillable tolylenediisocyanate was dissolved in 300 ml. of orthodichlorobenzene and added over a period of one hour to a stirred 1,000 ml. resin flask containing 100 ml. of 37% aqueous HCl and 50 ml. of ortho-dichlorobenzene held at 100° C. A portion of the water was removed by distillation at atmospheric pressure (maximum pot temperature 140° C.) and the remainder of the water was removed at reduced pressure (approximately 55 mm. Hg maximum pot temperature 105° C.). The product was a slurry of finely divided red-brown solids. The slurry was heated to 170° C. and phosgene (COCl$_2$) passed in at a rate of 189 gm. per hour for a period of two hours. The solids disappeared in approximately one and one-half hours. The product was degassed by heating at reflux for one-half hour with a small nitrogen purge, an aliquot was distilled to dryness at approximately 0.2 mm. Hg pressure, and the distillate was analyzed for tolylenediisocyanate.

The tolylenediisocyanate content of the original tar was increased to 67.9%, which corresponds to 43.0% conversion of the originally undistillable residue to tolylenediisocyanate. In the calculation of conversion it was assumed that 100% of the tolylenediisocyanate present in the tar before hydrolysis was converted back to tolylenediisocyanate by subsequent phosgenation.

EXAMPLE 2

A portion (98.3 gm.) of the same distillation residue used in Example 1 was dissolved in 300 ml. of orthodichlorobenzene and added over a period of fifty minutes to a mixture of 100 ml. of 37% aqueous HCl and 50 ml. of orthodichlorobenzene held at 100° C. During addition of the distillation residue anhydrous HCl was bubbled through the reaction mixture at a rate of 50 gm. per hour. The slurry was dried as described in Example 1, heated to 170° C. and $COCl_2$ added at a rate of 179 gm. per hours for a period of three hours. The solids disappeared in approximately two and one-half hours. The product was degassed as described in Example 1 and an aliquot distilled to dryness. Analysis of the distillate showed that 50.0% of the originally undistillable residue had been converted to tolylenediisocyanate.

EXAMPLE 3

Another portion of distillation residue obtained from the manufacture of an 80:20 mixture of 2,4- and 2,6-tolylenediisocyanate (104.4 gm., containing 49.2% distillable tolylenediisocyanate) was dissolved in 300 ml. of orthodichlorobenzene and added over a period of forty minutes to a mixture of 50 ml. of 37% aqueous HCl and 50 ml. of orthodichlorobenzene held at 25–30° C. Some cooling was required to keep the temperature in this range. The reaction mixture was held at 25–30° C. for one hour and then heated at atmospheric pressure to approximately 140° C. to remove some of the water. The rest of the water was removed at reduced pressure, the slurry heated to 170° C. and $COCl_2$ passed in at a rate of 182 gm. per hour for a period of two hours. The solids had all disappeared at the end of this time. The product was degassed as described in Example 1 and an aliquot distilled to dryness.

Analysis of the distillate showed that 27.2% of the originally undistillable residue had been converted to tolylenediisocyanate. By comparison, a sample of the same tar treated in a similar manner except the hydrolysis step was carried out at 100° C. and 25.8% conversion of undistillable residue to tolylenediisocyanate.

What is claimed is:

1. In a process for recovering aromatic diisocyanates of the group consisting of metaphenylene diisocyanate; 4,4'-methylene bis(phenylisocyanate); xylene diisocyanate; and tolylenediisocyanate, from distillation residues obtained in the manufacture of said aromatic diisocyanates by phosgenation of aromatic amines the steps comprising (1) adding a solution of the residues in an inert organic solvent, to aqueous hydrochloric or hydrobromic acid at about 25 to 150° C. whereby isocyanates, biurets and carbodiimides in said residues are at least partially hydrolyzed, (2) effecting contact of the resulting mixture with phosgene at about 150 to 200° C. in the presence of less than 10% by weight of water, based on the weight of still residues, whereby a phosgenation reaction occurs, and (3) recovering aromatic diisocyanate from the phosgenated mixture.

2. A process of claim 1 wherein water removal is effected by distillation at least before completion of the phosgenation step.

3. A process of claim 1 wherein the diisocyanate recovery of step (3) is effected by vacuum distillation.

4. A process of claim 1 in which the aromatic diisocyanate recovered in step (3) is a tolylenediisocyanate.

5. A process of claim 1 in which the inert organic solvent of step (1) is orthodichlorobenzene.

References Cited

UNITED STATES PATENTS

| | | | |
|---|---|---|---|
| 3,225,094 | 12/1965 | Wolf | 260—582 X |
| 3,499,021 | 3/1970 | Kober et al. | 260—453 X |
| 3,499,035 | 3/1970 | Kober et al. | 260—453 X |

CHARLES B. PARKER, Primary Examiner

D. H. TORRENCE, Assistant Examiner

U.S. Cl.X.R.

260—453 P, 582